United States Patent [19]

Napolitano, Jr.

[11] Patent Number: 5,471,623
[45] Date of Patent: Nov. 28, 1995

[54] LAMBDA NETWORK HAVING $2^{M-1}$ NODES IN EACH OF M STAGES WITH EACH NODE COUPLED TO FOUR OTHER NODES FOR BIDIRECTIONAL ROUTING OF DATA PACKETS BETWEEN NODES

[76] Inventor: Leonard M. Napolitano, Jr., 825 El Quanito Dr., Danville, Calif. 94526

[21] Appl. No.: 660,503

[22] Filed: Feb. 26, 1991

[51] Int. Cl.⁶ .................................................. G06F 13/00
[52] U.S. Cl. .............................. 395/200.03; 395/200.08; 395/200.15; 395/200.16; 370/60; 370/54; 364/931.42; 364/940.61; 364/931.03; 364/926.4; 364/931.01; 364/931.4; 364/931.41; 364/931.43; 364/942.06; 364/949.91; 364/949.94; 364/DIG. 2; 364/228.7; 364/229; 364/231.9; 364/238.8
[58] Field of Search ..................................... 395/800, 325, 395/200; 370/60, 54

[56] References Cited

U.S. PATENT DOCUMENTS

| | | | |
|---|---|---|---|
| 4,344,134 | 8/1982 | Barnes | 364/200 |
| 4,412,281 | 10/1983 | Works | 364/200 |
| 4,445,171 | 4/1984 | Neches | 364/200 |
| 4,453,630 | 6/1984 | Neches | 364/200 |
| 4,470,114 | 9/1984 | Gerhold | 364/200 |
| 4,475,192 | 10/1984 | Fernow et al. | 370/17 |
| 4,493,021 | 1/1985 | Agrawal et al. | 364/200 |
| 4,593,154 | 6/1986 | Takeda et al. | 178/2 D |
| 4,630,259 | 12/1986 | Larson et al. | 370/60 |
| 4,811,210 | 3/1989 | McAulay | 364/200 |
| 4,925,311 | 5/1990 | Neches et al. | 364/200 |
| 4,933,933 | 6/1990 | Dally et al. | 370/60 |
| 4,943,909 | 7/1990 | Huang | 364/200 |
| 5,067,124 | 11/1991 | Killat et al. | 370/60 |
| 5,079,762 | 1/1992 | Tanabe | 370/60 |
| 5,140,584 | 8/1992 | Suzuki | 370/60 |
| 5,157,692 | 10/1992 | Horie et al. | 375/38 |
| 5,159,595 | 10/1992 | Flanagan et al. | 370/85.15 |
| 5,175,733 | 12/1992 | Nugent | 370/94.3 |
| 5,181,017 | 1/1993 | Frey, Jr. et al. | 340/825.02 |
| 5,218,676 | 6/1993 | Ben-Ayed et al. | 395/200 |
| 5,253,248 | 10/1993 | Dravida et al. | 370/16 |

OTHER PUBLICATIONS

Gopal, "Prevention of Store–and–Forward Deadlock in Computer Networks", IEEE Trans. Commun., vol. COM–33, No. 12, Dec. 1985, pp. 1258–1264.
Chan et al, "An Algorithm for Detecting and Resolving Store–and–Forward Deadlocks in Packet–Switched Networks", IEEE Trans. Commun., vol. COM–35, No. 8, Aug. 1987, pp. 801–807.
Gelernter, "A DAG–Based Algorithm for Prevention of Store–and Forward Deadlock in Packet Networks", IEEE Trans. Comput., vol. C–30, No. 10, Oct. 1981, pp. 709–715.
Günther, "Prevention of Deadlocks in Packet–Switched Data Transport Systems", IEEE Trans. Commun., vol. COM–29, No. 4, Apr. 1981, pp. 512–524.
C. Wu et al., "The Universality of the Shuffle–Exchange Network", *IEEE Transactions on Computers*, vol. C–30, No. 5, May 1981, pp. 324–332.
H. Siegel et al., "Using the Multistage Cube Network Topology In Parallel Supercomputers", *Proceedings of the IEEE*, vol. 77, No. 12, pp. 1932–1953, Dec. 1989.
N. Koike et al., "Man–Yo: A Special Purpose Parallel Machine For Logic Design Automation", *1985 International Conference on Parallel Processing*, pp. 583–590, Aug. 1985.

(List continued on next page.)

*Primary Examiner*—Thomas C. Lee
*Assistant Examiner*—Paul Harrity

[57] ABSTRACT

The Lambda network is a single stage, packet-switched interprocessor communication network for a distributed memory, parallel processor computer. Its design arises from the desired network characteristics of minimizing mean and maximum packet transfer time, local routing, expandability, deadlock avoidance, and fault tolerance. The network is based on fixed degree nodes and has Ⓞ mean and maximum packet transfer distances where n is the number of processors. The routing method is detailed, as are methods for expandability, deadlock avoidance, and fault tolerance.

14 Claims, 9 Drawing Sheets

OTHER PUBLICATIONS

V. Balasubramanian et al., "A Fault tolerant Massively Parallel Processing Architecture", *Journal of Parallel and Distributed Computing*, vol. 4, pp. 363–383, 1987.

F. Wong et al., "A Loop–Structured Switching Network", *IEEE Transactions On Computers*, vol. C–33, No. 5, pp. 450–455, May 1984.

R. Finkel et al. "The Lens Interconnection Strategy", *IEEE Transactions on Computers*, vol. C–30, No. 12, pp. 960–965, Dec., 1981.

F. Preparata et al., "The Cube–Connected Cycles: A Versatile Network For Parallel Computation", *Communications of the ACM*, vol. 24, No. 5 pp. 300–309, May 1981.

RING

4-CONNECTED MESH

HYPERCUBE

FULLY CONNECTED

| NUMBER OF STAGES | NUMBER OF PEs | MEAN DISTANCE | MAXIMUM DISTANCE |
|---|---|---|---|
| 2 | 4 | 1.33 | 2 |
| 3 | 12 | 1.73 | 3 |
| 4 | 32 | 2.71 | 4 |
| 5 | 80 | 3.49 | 5 |
| 6 | 192 | 4.57 | 7 |
| 7 | 448 | 5.49 | 8 |
| 8 | 1024 | 6.60 | 10 |

LAMBDA NETWORK HAVING $2^{M-1}$ NODES IN EACH OF M STAGES WITH EACH NODE COUPLED TO FOUR OTHER NODES FOR BIDIRECTIONAL ROUTING OF DATA PACKETS BETWEEN NODES

The United States Government has rights in this invention pursuant to Contract No. DE-AC04-76DP00789 between the United States Department of Energy and AT&T Company.

BACKGROUND OF THE INVENTION

This invention relates generally to the field of parallel processing computers and, more specifically, to interprocessor communication networks in distributed memory parallel processor computers.

One of several parallel processor computer architectures is the distributed memory, parallel processor computer (DMPPC). A DMPPC has processor-memory pairs called processing elements and information is transferred among the processing elements by the interprocessor communication network. A given problem is "parallelized" by being divided into concurrent tasks which are assigned to the processing elements. These tasks exchange information via the interprocessor communication network. The topology of a network refers to the identification of processing elements pairs between which information can be directly transferred. The primary purpose of the interprocessor communication network is efficient transportation of information between processors. Unless the transport time can be overlapped with the processing time, the transport time becomes computational overhead which degrades the computer's performance. Therefore, to maximize parallel processor performance, the time required to move information, usually in bit sequences called data packets, between processors must be minimized. For a single packet moving through a network, the travel time for the packet is proportional to the distance it travels from its source to its destination. Links are the direct communication channels between processor nodes. Links may allow packet transport either in one direction, i.e., unidirectional, or in both directions, i.e., bidirectional.

One of the enticements for parallel processing is that for bigger problems one can use more processors and, for a perfectly parallel problem, the execution time will be constant and relatively independent of problem size. One central issue is the difficulty of combining parallel processor computers having a smaller number of processors into larger computers. The difficult problem of expandability is exemplified by the hypercube system; trying to expand smaller hypercube systems into a single larger hypercube system. As a hypercube network grows, the distance that an information packet must travel grows by $\log_2(n)$ where n is the number of nodes in a network. But to accommodate the expansion, the design of every single node must be reconfigured. What this means is that communication ports would have to be added, allocation wires and address locations would have to be reconfigured; in essence, every aspect of how information packets move through a node from input port to output port would have to be modified in expansion.

The rate at which information can be transferred in a system is proportional to the distance over which the packet must travel and inversely proportional to the bandwidth of a link. For a realizable network, the bandwidth of a link is not independent of the network topology. The total I/O bandwidth of a network node is finite, for example, the bandwidth may be limited by the number of available pins on a chip multiplied by the transmission bandwidth through each pin. Neglecting the bandwidth between the node and its attached processing element(s) and assuming the bandwidths of all links are the same and fixed in time, i.e., the total node bandwidth is not dynamically reapportioned between links, the bandwidth of any one link is the total node bandwidth divided by the number of links attached to the node. Each direction of a link is counted separately. Therefore, as the number of links connected to a node increase, the link bandwidth decreases. Thus, the time required to transport data packets from one node to another significantly increases.

One approach to obtain the desired logarithmic distance properties without having the $\log_2(n)$ increase in the number of connections is to configure the number of communication ports per node independently of network size. But known systems with a fixed number of communication ports per node have only unidirectional flow of information packets. Unidirectional information flow is problematic because these systems are not easily fault tolerant. If there is a failure in the system to prevent or retard the flow of information, global reconfiguration and rerouting is required.

Information does not usually flow through a packet-switched network unimpeded. A conflict occurs when two packets desire to traverse the same output link from a switch point at the same time and is resolved by having one packet wait in a queue while the other packet traverses the link. The total time required to send a packet from its source to its destination is thus dependent on two factors, the transit time between the ports through the network and the number of conflicts the packet experiences.

When network traffic density is low, conflicts are less common and the packet transfer time is primarily a function of the distance between the source port and the destination port. When traffic density is high, the transfer time is primarily a function of the time the packets spend in queues at switch points waiting for routing through contested links.

Store-and-forward deadlock occurs in a packet-switched network when from among a group of packets, no packet has arrived at its destination and no packet can make the next hop toward its destination. A cycle of nodes exists where no node can accept a packet from the previous node in the cycle because no storage is available for a packet arriving at the node. Movement of packets through the links in the cycle is stopped, and without special procedures, it can never be restarted. Usually, deadlocking in part of the network leads to deadlocking in the entire network. Either the network design should avoid deadlocked states or it should facilitate restarting itself from a deadlocked state without loss of packet information.

Reliability and fault tolerance are two increasingly important issues in interprocessor communication network design. A network's fault tolerance is its ability to perform in the presence of component failures. As the number of network components, e.g., nodes and links increases, the probability of a component failure within the network also increases. For single stage networks with one port per network node, reducing the number of network links reduces the probability of having a component failure within the network. Unfortunately, reducing the number of components "at risk" does not necessarily make the network more robust. Assuming if the tasks assigned to its attached processing element can be reassigned to other processing elements when a node fails, a network fails when it can no longer move information between arbitrary pairs of nodes. The failure of two bidirectional links in the ring network causes the network to fail because the ring is converted into two disjoint line networks unable to pass information between them.

Networks may also be made fault tolerant by having redundant paths between source-destination node pairs so that information can move around failed network components. For fault tolerance to be implemented, the routing switching function must be able to generate auxiliary paths around the failed components.

Several reviews of proposed interprocessor communication network designs can be found in the references of Feng; Agrawal et al.; and Siegel. The hypercube networks, the Hypertree network, the perfect shuffle network, and the Illiac IV network, are all network topologies that fall into the taxonomic class of single stage, nonreconfigurable, packet-switched networks.

Also in that taxonomic class, the topologies of the indirect binary n-cube network, the SW-banyan network, and the loop-structured switching network all are similar. The MAN-YO network of Koike and Ohmoir also has a similar topology, but allows only one-directional flow of information. Each node can receive information from two nodes and send information to two different nodes. The CBAR network of Balasubramanian and Bannerjee also allows only one-direction information flow, but its topology is slight different because the inverse perfect shuffle of links does not occur below the last stage. Wong and Ito's Loop Structured Switching Network is very similar to the MAN-YO network, but has two processing elements attached to each network node. Each processing element's input and output port are split across the node to allow the two processing elements attached to the node to exchange information through the node. In addition, Wong and Ito specifically consider problems of deadlock avoidance. The unidirectional systems are not fault tolerant. As discussed, if there is a failure in the system, the information packet must be rerouted through the network again, often through a global controller, and if there is a complete break in a link or other component, the packet will be unable to get to a specific destination processor.

An example of a interconnection network having unidirectional flow and a global controller is given in U.S. Pat. No. 4,811,210 to McAuley. McAuley teaches a network which uses one stage of a butterfly interconnection network to connect N/2 processors to two N/2 by N/2 optical crossbar switches requiring global control of the crossbar switches. With global control, an omniscient controller sets the individual switch points to provide a path between the information source and destination. With global control the network does not require a regular topological structure because the omniscient controller can always discern the shortest path between any two ports. Unfortunately, for larger networks with heavy information traffic, the controller must be omnipotent as well as omniscient.

Two-directional information flow networks include the lens network and the cube-connected cycles network. The lens network of Finkel and Solomon uses buses to connect sets of processing elements which are nondirect paths between processing elements. Thus, the throughput or traffic density is lower and has arbitration for a shared resource, thereby requiring additional logic and more hardware. There are typically three processors attached to each bus. In the cube-connected cycles network of Preparata and Vuillemin, each network node is connected to three other nodes by bidirectional links, and if pairs of nodes are considered, each pair has four bidirectional communication links. But, these networks don't address routing, packet movement, conflict resolution, deadlock avoidance.

With respect to expandability, some networks, such as the ring and shuffle-exchange networks, are incrementally expandable, while others must be expanded in fixed amounts or by fixed factors, for example the hypercube must be expanded by a factor of two. In addition, some networks require substantial modifications to each node to expand. Again, the hypercube requires an additional bidirectional link at each node to increase to the next larger network size. Other networks, such as the shuffle-exchange, require significant rewiring between nodes as the network expands.

Also, some networks such as the hypercube may require preprocessing of a problem to configure the problem for the machine, a process called proximal mapping. Unfortunately, the general mapping problem that maps problems onto processing elements so that computationally adjacent tasks which exchange information are assigned to proximal processing elements, has been shown to be NP-complete, i.e., the solution time of the problem increases exponentially to the number of pieces in the problem and even when solved the generated mapping is only effective for problems in which the pairs of communicating tasks are known a priori and do not change in time.

Several network topologies shown as prior art in FIG. 1 exemplify the range of interprocessor distance possibilities when using bidirectional communication links between network nodes. In the ring network, every network node is connected to two other neighbors or network nodes to form the ting. The maximum and mean distance that a packet must travel in a ring network given an odd number n nodes is $\lfloor n/2 \rfloor$ and $(n+1)/4$, respectively. In the edge-wrapped 4-connected mesh network, also called a toroidal network, each network node is connected to four other network nodes in a square mesh pattern. Nodes along the edges are connected to nodes on the opposite edge. For n nodes, where $\sqrt{n}$ is odd, the maximum and mean transit distance is $2\lfloor \sqrt{n}/2 \rfloor$ and $(\sqrt{n}+1)/2$, respectively. For the n-dimensional binary hypercube, each of the $2^n$ nodes is connected to n other nodes, and the mean and maximum transit distance is $n\log_2(n)/2(n-1)$ and $\log_2(n)$. The connections represent the edges of a binary hypercube and the addresses of two directly connected nodes differ in only a single bit. In a hypercube, having $\mathcal{O}(\log n)$ distance, each node must have the number of neighbors equal to the $\log_2$ of the number of processing elements, n. For example, if the hypercube network has sixteen processing elements, then each node will have four neighbors, and if the hypercube network has 256 processing elements, then each node has eight neighbors. In the fully connected network, every node is connected directly to every other node. The mean and maximum distances between network nodes for these networks are 1. For a network with n nodes, these distances range from $\mathcal{O}(n)$ to $\mathcal{O}(1)$.

SUMMARY OF THE INVENTION

A multiprocessor communication network and a method for the transfer of data packets is a distributed memory parallel processor computing system, called the Lambda network, has been invented.

It is an object of the invention to withstand failure of components within the multiprocessor communication network. The feature of the invention which achieves this object is the ability of the Lambda network to route information packets around damaged areas. An additional advantage of this feature is the Lambda network is made more robust.

It is another object of the invention to minimize the number of components in the a communication network. The Lambda network achieves this object using a fixed number of links per node and making the number of links independent of network size. Enhanced reliability of the Lambda network results.

It is yet another object of the invention to avoid entering into a deadlock state. Two features of the Lambda network achieve this object. First, the Lambda network recirculates packets within a queue; and second, the Lambda network restricts packet movement based on the available queue size of the next node. A most excellent advantage of these features is that deadlock can never occur, thus data information is not lost and can always be recovered, and there is minimal hardware overhead to avoid deadlock and improve reliability.

It is still another object of the Lambda network to facilitate network expandability. The feature that eases network expansion is that the number of neighboring nodes does not change with network size, and the network can be expanded in discrete steps. An advantage of the feature is that when expanding more of the smaller Lambda networks can be reused because the bulk of the processing element connections are within a node, rather than external to a node.

It is yet another object of the invention to achieve local control of bidirectional routing of the information packets. This object is achieved by constructing current node and destination node addresses, constructing loop addresses, exclusive-Oring and normalizing to obtain a loop resultant. The movement to the next node and the direction of travel is determined by the value of particular bit positions. An additional advantage of this feature is that global control is not required thereby reducing hardware control, and, at the very least, increasing efficiency.

Thus, it is yet another object of the Lambda network to minimize mean and maximum interprocessor communication time in a distributed memory parallel processor computer system. The Lambda network displays $O(\log_2 n)$ mean and maximum communication times for networks with n nodes and p equal to n processors.

These and additional objects are realized in a multiprocessor communication network with a plurality of nodes arranged in m stages, each of the nodes being connected by links to four other nodes; a plurality of processing elements equal to the number of nodes, each of the processing elements located at one node; means at each node for localized control of packet routing between adjacent nodes; and means at each node for bidirectionally routing packets between adjacent nodes, in which the number of nodes is said network is $m2^{m-1}$ nodes, where m is an integer having a value of at least two.

Each node of the Lambda network includes a switch point for routing packets from one link to another; a node input communication port and a node output communication port at each link for the transfer of packets between a specific node and each of the four other nodes connected to said specific node; a processing element input communication port and a processing element output communication port for the transfer of packets between said specific node and its processing element; and further includes at least one input FIFO queue associated with each communication port; an output multiplexer; and routing determination circuitry. A packet arriving at one of the nodes is placed in one input FIFO queue, and the routing determination circuitry selects a communication output port for routing the packet, and the output multiplexer outputs the packet. The node design has several embodiments where there is a varying number of input queues per input port.

Moreover, a method for local control of routing data packets between adjacent nodes along bidirectional loops in a distributed memory parallel processor computer system has been invented, the method being: first, constructing a current loop address of the data packet given a current node address; constructing a destination loop address of the data packet given a destination node address; transforming the current loop address to the destination loop address to produce a loop resultant; normalizing the destination address and the loop resultant; switching loops according to the value of a predetermined bit of the normalized loop resultant; and changing direction according to the value of a predetermined bit of the normalized destination stage address, the value of a predetermined bit of the normalized loop resultant, and stage size of the system.

In addition, a method for deadlock avoidance in a distributed memory parallel processor computer system has been invented, where each of the nodes have five input FIFO queues connected to each node input communication port at each link for the transfer of packets between a specific node and each of the four other nodes connected to said specific node and connected to a processing element input communication port for the transfer of packets between a specific node and its processing element; the method comprising: determining the number of nodes that a data packet must traverse to reach its destination node; transmitting the data packet to the next node only when the number of packet storage spaces in the fullest input queue of the next node is equal to the number of nodes that a data packet must traverse to reach its destination; and recirculating data packets in any queue when data packets have not been transmitted from a queue after a predetermined time.

BRIEF DESCRIPTION OF DRAWINGS

In the course of the following detailed description, reference will be made to the attached drawings in which.

DETAILED DESCRIPTION OF THE INVENTION

The Lambda network is a nonreconfigurable, single stage, packet-switched interprocessor communication network for a distributed memory parallel processor computer system. Its design minimizes mean and maximum packet transfer time, and features additional advantages of local routing, expandability, deadlock avoidance, and fault tolerance.

In a packet-switched network, the transported information is assembled into small messages called packets which move through the network in a discrete step-wise fashion. In addition to the information, each packet must contain not only a destination address so that the packet can be routed but also the sender's address and other specifiers identifying the information transported. To simplify the design and operation of the network, all packets are assumed to be the same size, although the system may be configured to accommodate different size packets.

A packet-switched communication network is composed of links and nodes. Links are the communication channels between nodes, and for most systems the links will be the wires along which the information travels. In nonreconfigurable networks, rearrangement of the link connections between nodes to accommodate problem communication topologies is not permitted. Links intersect at the nodes. Within each node is a switch point where packets are routed from one link to another. The nodes also contain ports which is where a packet can enter or leave a node along a link. In single stage networks, also called direct networks, all network nodes contain one port interfacing the network and an attached processing element; thus, the number of network nodes is equal to the number of attached processing elements. A set of links that allows packet transfer from one node to another node is called a path between the nodes. The number of links in a path is called the length of the path, and the length of the shortest path between two nodes is called the distance between the nodes. The system is the combination of the network, nodes, and links.

In a generic m stage Lambda network, the stages are numbered from 0 to m−1. The Lambda network, then, is comprised of $m2^{m-1}$ nodes arranged on m levels or stages, where m is an integer greater than or equal to two. Each node is connected via bidirectional communication links to four other nodes. The Lambda network is based on fixed degree nodes and has $O(\log p)$ mean and maximum packet transfer distances where p is the number of processors. The Lambda network has fixed degree nodes which means that each node has the same number, four, of neighbors regardless of the size of the network. The fixed configuring of the network, thus, permits the use of commercially available processor products with only a limited number of external communication channels available, e.g., the Inmos Transputer.

Figure 1:
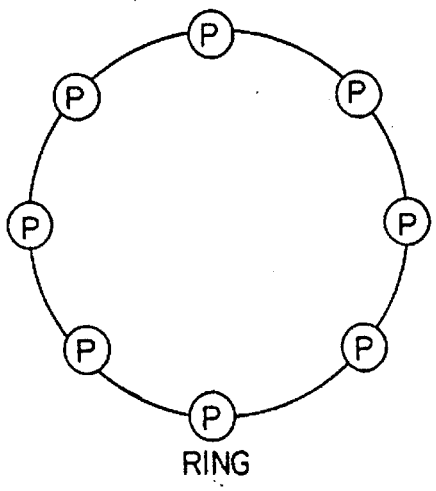
FIG. 1 illustrates several network topologies of the prior art.
Figure 1:
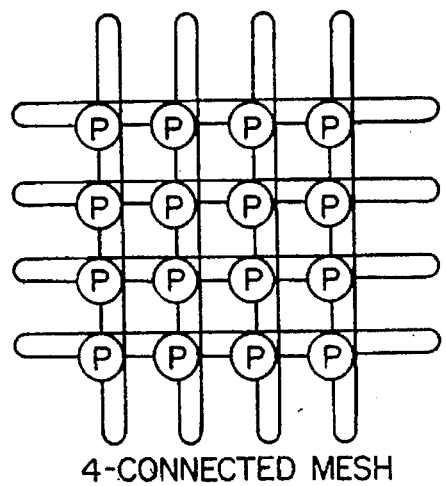
Figure 1:
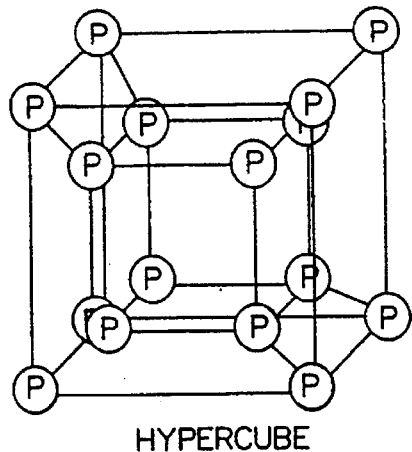
Figure 1:
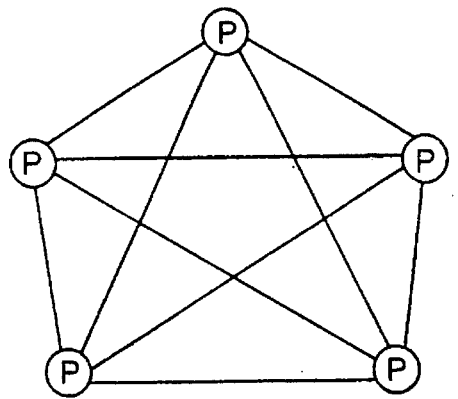
Figure 2:
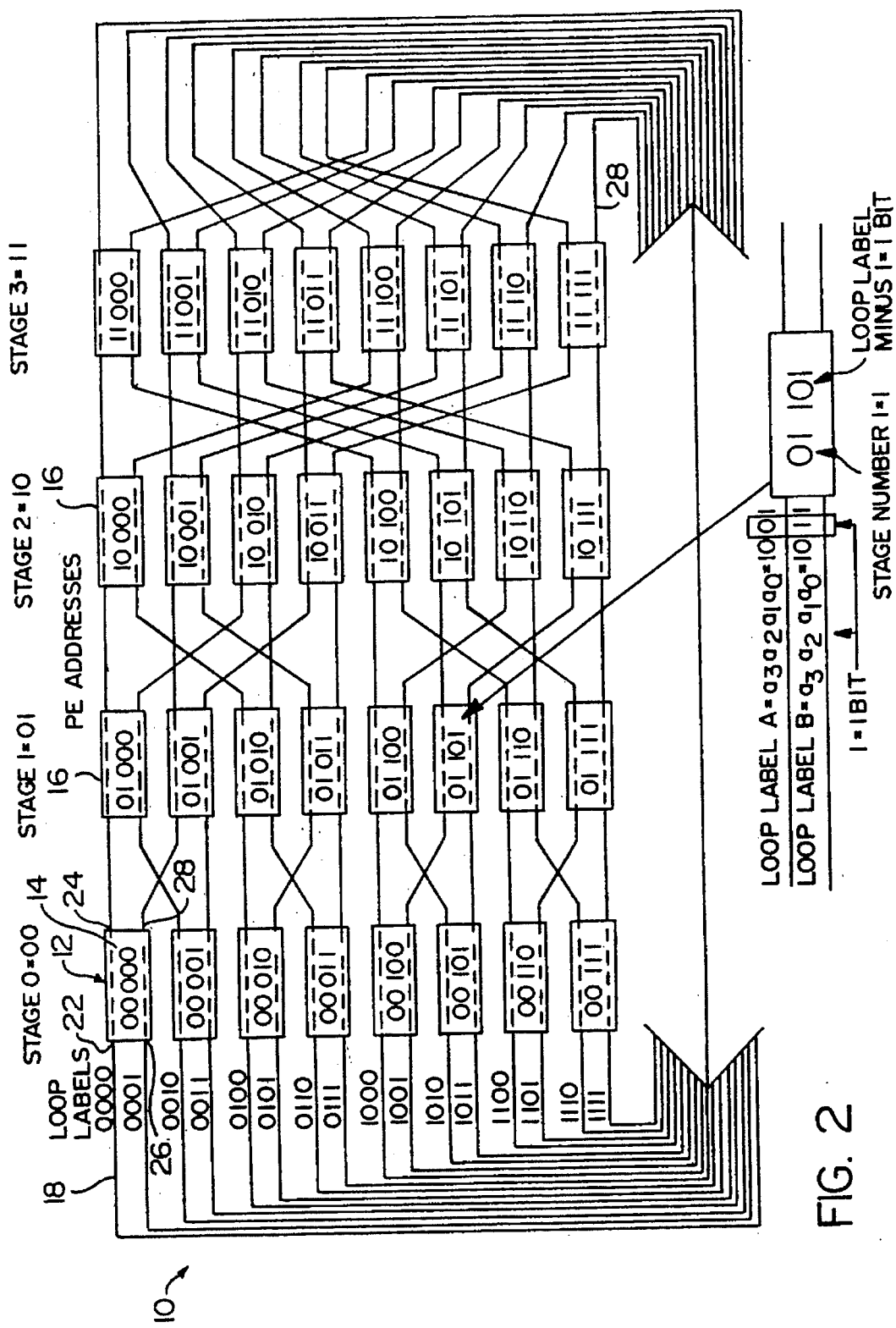
FIG. 2 illustrates a four stage Lambda network.

A four stage Lambda network 10 having thirty two nodes 12 is shown in FIG. 2. In describing the invention, the numbering of processing elements (PE) 14 is the same as the numbering of network nodes 12. The node positions in a stage 16 are numbered from 0 to $2^{m-1}-1$. The node address is the concatenation of the stage number and the node position in the stage. The stage number requires j bits, where $j=\lceil \log_2 m \rceil$ stage address bits, $s_{j-1} \ldots s_1 s_0$. The node position in the stage address requires k bits, where k=m−1 and is represented by the stage address bits, $p_{k-1} \ldots p_1 p_0$. Thus, the total node address comprises k plus j bits, and the complete node address is $s_{j-1} \ldots S_1 S_0 p_{k-1} \ldots p_1 p_0$.

Since the concatenation of the stage address bits is the stage number s, the complete processor address can be written as $\{S\} p_{k-1} \ldots p_1 p_0$. Because the Lambda network is a fixed node network having four neighbors, the neighbors of this processor can be specified by their addresses:

"RIGHT" neighbors $\{s+1\} p_{k-1} \ldots p_{s+1} 0/1 \, p_{s-1} \ldots p_1 p_0$,     if $s < k$ $\{0\} 0/1 \, p_{k-1} \ldots p_1$,     if $s = k$ "LEFT" neighbors $\{s-1\} p_{k-1} \ldots p_s 0/1 \, p_{s-2} \ldots p_1 p_0$,     if $s > 0$ $\{k\} p_{k-2} \ldots p_0 0/1$,     if $s = 0$ In the networks 10 as shown in FIG. 2, a series of loops 18 running through the stages 16 of the network 10 are created if the network node switch points are set so that the upper left 22 and upper right links 24 to a network node are connected and the lower left 26 and lower right 28 links to a network node 12 are connected. At each node within the Lambda network, only two loops cross; thus within an m stage network, there will be $2^m$ loops. The loops 18 are numbered from 0 to $2^{m-1}$. For a network node 12 in stage i with address $s_{j-1} \ldots s_1 s_0 p_{k-1} \ldots p_1 p_0$ the loop 18 running through the left side has number $1_l = p_{k-1} \ldots p_i 0 p_{i-1} \ldots p0$ and the right side has number $1_b = p_{k-1} \ldots p_i 1 p_{i-1} \ldots p_0$.

The Lambda network minimizes information transit time using the structural method, as opposed to the technological approach which uses faster more powerful electronics and increases the communication rate of an increased number of wires. The structural method, and specifically the Lambda network, takes advantage of the topological design of the network and the design and operation of the network's elements, and addresses the distance packets must travel between their source and their destination. The Lambda network, moreover, attacks the packet travel distance problem by minimizing the mean and maximum distance between any pair of processing elements, rather than the alternative approach of mapping the problem onto the processing elements so that computationally adjacent tasks which exchange information are mapped to proximal processing elements.

Within the Lambda network, the maximum and mean distances between network nodes are approximately proportional to the $\log_2$ and $\frac{2}{3}(\log_2)$ of the number of nodes, respectively. The approximation is required because no proper inverse exists for the relationship between the number of nodes in the system and the maximum and average distance between an arbitrary pair of nodes in that system. The mean and maximum distances for various Lambda network sizes are given in a table of FIG. 2. Because the number of neighbors for each node is constant, i.e., independent of network size, and disregarding conflicts, the mean and maximum transfer times of a packet between processing elements is $O(\log_2 p)$ where p is the number of processing elements.

The interprocessor packet transfer time is related to the interprocessor distance. The total time t required to transfer one packet between two network nodes is the sum of the times required to transport the packet over each link in the path, where d is the number of links in the path. Each of these link times is the packet size s (in bits) divided by the link bandwidth b.

The total time thus becomes:

$$t = \sum_{i=1}^{\substack{d \text{ links} \\ \text{in path}}} s/b_i$$

If all of the network links have the same bandwidth b, this can be rewritten as:

t=ds/b.

The transit times for n node networks range from $\mathbb{O}(n)$ to $\mathbb{O}(\log_2 n)$.

For routing packets through the network, the Lambda network uses local control. When a packet, headed by its destination address, enters a node, the destination address is compared with a node's address to determine the routing of the packet over the shortest path to its destination. If a node address is known, the address of the two loops which go through that node can be determined. Thus, by figuring out the movement of a data packet on the loops, the best path can further be determined. A simple routing scheme which normalizes the routing addresses uses the same routing circuitry for all nodes in the Lambda network.

When routing a packet going from node a to node b, the node address for a is $s^a p^a = s^a_{j-1} \ldots s^a_1 s^a_0 p^a_{k-1} \ldots p^a_1 p^a_0$, and the node address for b is $s^b p^b = s^b_{j-1} \ldots s^b_1 s^b_0 p^b_{k-1} \ldots p^b_1 p^b_0$. The loops going through these two nodes are $1^a = 1^a_k \ldots 1^a_0 = p^a_{k-1} \ldots X \ldots p^a_0$, and $1^b = 1^b_k \ldots 1^b_0 = p^b_{k-1} \ldots X \ldots p^b_0$, where X is a "don't care" which is inserted in the $s^a$th bit position in loop address $1^a$ and in the $s^b$th bit position in loop address $1^b$. Complete loop-based addresses L can be constructed for both a and b by concatenating their stage addresses s with their loop addresses 1: $L^a = s^a 1^a$ and $L^b = s^b 1^b$.

To route a packet from a to b, the complete loop address $L^a$ must be transformed to $L^b$. Moving between the two loops at a network node in stage i toggles the ith bit in the loop address. For routing, these loop changes can be determined by exclusive-ORing the destination loop address $1^b$ and the current node loop address $1^c$ to produce the loop resultant $r = r_k \ldots r_0 = 1^b \oplus 1^c$. The position of the 1's in r denote the stages where loop changes are required. There will be one "don't care" in r for the destination stage because the loop addresses of the two loops running through the destination node differ only in this bit position and entering the node on either loop is acceptable. Moving between two adjacent nodes in the Lambda network either increments or decrements the stage address s, i.e., s+1 mod m and s−1 mod m.

Figures 3, 4:
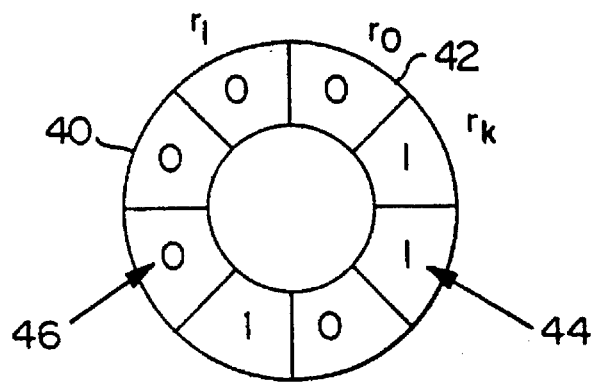
FIG. 3 is a table of mean and maximum internode distances of the Lambda network.
FIG. 4 is a ring model for address normalization of the Lambda network.

Using this procedure, two stage addresses and the loop resultant must be used to determine the proper packet routing, but the technique can be modified so that only one normalized stage address and the normalized loop resultant are necessary. Imagine circularly connecting r so that $r_k$ is attached to $r_0$ as shown in FIG. 4. This ring 40 has m positions 42, one for each network stage or bit position in the resultant. Two pointers onto this ring specify the current stage address and destination stage addresses. Moving clockwise around the ring 40 is identical to moving up through the network; moving counterclockwise around the ring 40 is identical to moving down through the network. The optimal routing of a packet can be viewed as the shortest path along the ring 40 which starts at the current stage C 44, finishes at the destination stage D 46, and passes through every ring position where the bit value of r is 1. These are the positions where the packet must move between loops to arrive on one of the two loops that through the destination node. As a packet moves between loops, a resultant bit value is changed from 1 to 0 so that at arrival at the destination stage, the resultant r is all zeroes.

The normalized stage addresses and normalized loop resultant are generated by breaking the ring just clockwise to the current stage bit position. The normalized current stage address becomes bit position 0 and thus can be implied in the routing determination. The normalized destination stage address becomes bit position D'=D−C mod m. If the current stage is i, the normalized resultant is $r' = r_{i-1} \ldots r_0 r_{m-1} \ldots r_i$. The normalized destination stage address and the normalized loop resultant are sufficient for routing.

There are two routing decisions for a packet entering a node: (1) whether to switch loops in the node; and (2) whether to change direction of travel in the node, i.e., move towards a lower stage number or towards a higher stage number. Bit 0 in the normalized loop resultant specifies the loop switching; if the value of the bit is 1, then the packet will switch loops; if the value of the bit is 0, then don't switch. The exit direction is a function of the normalized destination stage address, the normalized loop resultant, and the stage size of the network. For a given size network with p network nodes, there are 2 p possible bit combinations in the concatenation of the normalized destination stage address and the normalized loop resultant. The logical function of bit positions in the normalized loop resultant has been empirically derived and may be programmed. Alternatively, a ROM lookup table which requires 2 p addresses with an exit direction specified for each address may be used to determine the direction of packet travel.

Figure 5:
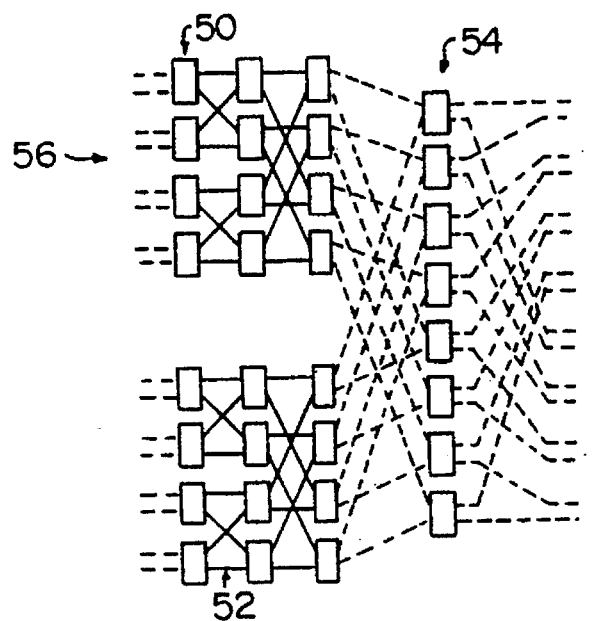
FIG. 5 illustrates the combination of two Lambda networks having three stages to produce a four stage Lambda network.

Smaller Lambda networks can be combined in the formation of larger Lambda networks. FIG. 5 shows how two three-stage Lambda networks 50 and 52 are combined with an additional stage 54 of nodes and processing elements to form the four-stage Lambda network 56. To generate an m stage Lambda network from two m−1 stage Lambda networks, the connections between the first and last stages are broken, another stage of nodes is added, and the connections between the last stage of the smaller networks and the new stage and between the new stage and the first stage of the smaller networks are formed.

Figure 6:
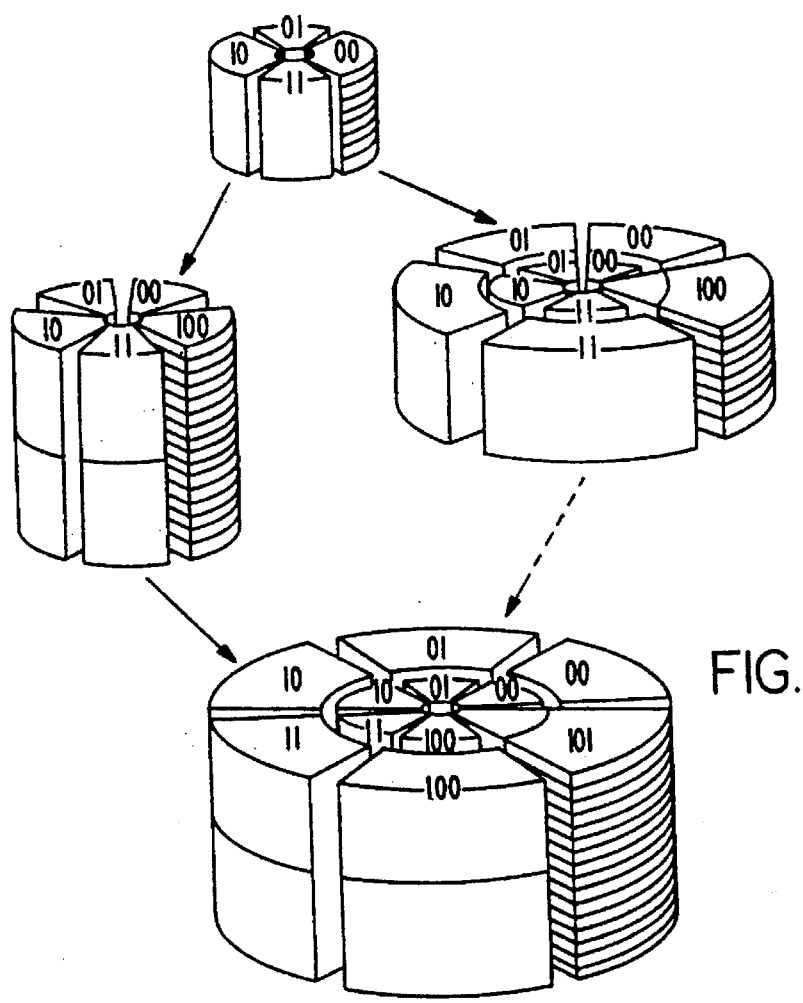
FIG. 6 is a cylindrical structure for the Lambda network.

The Lambda network has a natural three-dimensional cylindrical structure, as shown in FIG. 6, with individual stages running along the cylinder spaced equidistant around the circumference. Constructing larger Lambda networks from smaller ones is done by adding the required extra stage(s) circumferentially and combining the smaller networks either axially or radially.

Figure 7:
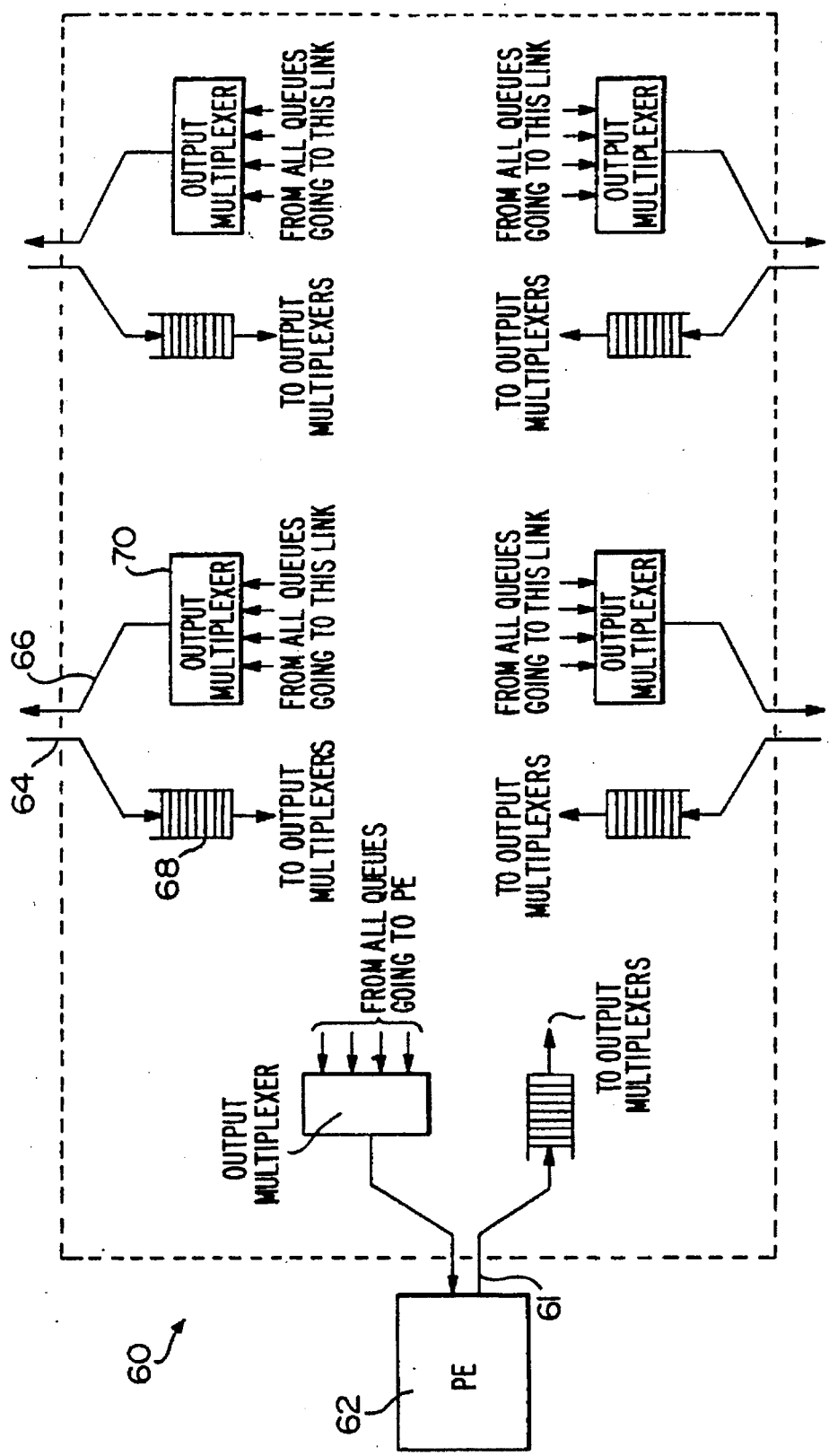
FIG. 7 is a simple model for a Lambda network node.

The deadlock avoidance scheme for the Lambda network is incorporated in the network node design. The basic network node 60, shown in FIG. 7, is connected to a processing element 62 in a one-to-one relationship. The node 60 has two communication ports per link 61, for a total of ten communication ports, five of which are input ports (one of which is labeled 64), five of which are output ports (one of which is labeled 66). Connected to each input port 64 is at least one input FIFO queue 68. Connected to each output port 66 is an output multiplexer 70, and routing determination circuitry (not shown).

The deadlock avoidance scheme uses a localized deadlock detection method combined with restrictions on packet movements between nodes to eliminate all deadlocked states in the network. A packet arriving at node 60 is placed in a FIFO queue 68. Routing determination circuitry uses the packet destination address to select which node output port 66 of which link 61 the packet will exit along. The output port 66 of that link 61 is fed by an output routing multiplexer 70 whose inputs are all the queues whose packets can be routed out along that link. A round robin priority scheme is used to select the packet routed through the multiplexer.

Figure 8:
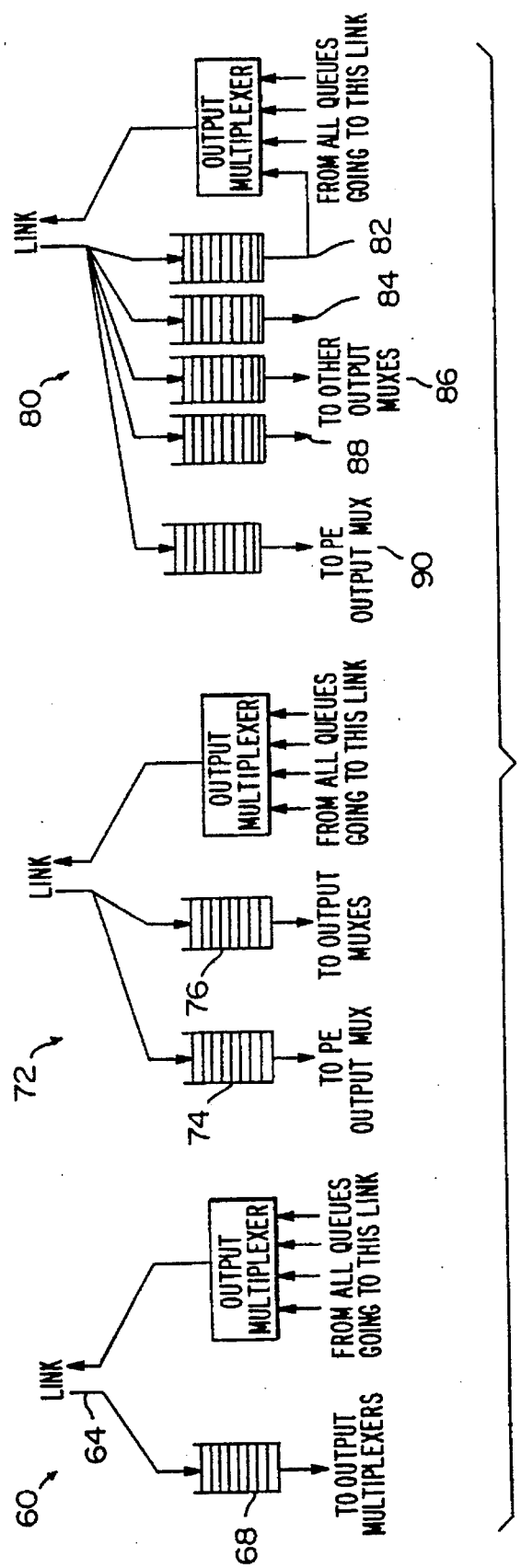
FIG. 8 shows the different input queuing arrangements to prevent internal node blocking in the Lambda network.

The deadlock avoidance scheme can be embodied in the Lambda network using three variations, but deadlock is avoided in the same way for all three node designs. The variations of network node design trade hardware complexity for network performance under high network traffic conditions and are shown in FIG. 8. The simplest node design 60, Type 1—no presort, uses a single FIFO queue 68 for each node input communication port 64 of a link 61, including the input from the attached processing element 62, as shown in FIG. 7. A shortcoming of the single queue node design 60 is that only packets at the head of the queue can be routed. If the packet at the head of queue 68 is blocked by a routing conflict, all other packets in the queue 68 must also wait. Even packets destined for the processing element 62 attached to the node 60 are blocked.

As shown in FIG. 8, a more complex node design 72, Type 2—destination presort, addresses the destination node blocking by partially presorting incoming packets into two queues 74 and 76, one queue 74 for packets arriving at their destination node for processing by the processing element #, one queue 76 for packets to be routed to other nodes. This packet presorting requires the routing determination circuitry to occur between the input link and the input queues. The routing can be performed simultaneously with queue loading by loading all input queues, then deleting the packet from all input queues through which it should not be routed.

The preferred and most complex node design 80, Type 3—full presort, solves all blocking problems for a particular input link by fully presorting incoming packets into five queues 82–90, one queue for each node output link 82–88 and one queue for the attached processing element 90.

Deadlock avoidance is achieved as follows. The distance of a packet in a network node from its ultimate destination is found by an added entry in the routing lookup table or can be calculated from address concatenation. For each input link to a node, there is an available buffer size QSIZE that is equal to the minimum over all queues attached to that link of the queue size minus the number of packets stored in that queue. A packet is not allowed to traverse a link unless the available buffer size in terms of number of packets at the end of the link is greater than or equal to the distance in terms of number of links the packet has left to travel. For example, if a packet must travel through eight nodes to reach its destination node, the packet will not be allowed to traverse to the next node unless there are at least eight packet storage locations available in the fullest queue of the next node. Although this does require that the length of input queues be greater than the maximum distance in the network, the logarithmic growth of maximum distance in the Lambda network does not make this a major penalty. To implement this avoidance scheme, a node must know the available buffer sizes of nodes adjacent to it for its routing logic.

Two extra features are added to each node. The first is a recirculating path around each queue to avoid deadlock in the Lambda network. If the node appears deadlocked, then each of the deadlocked queues is recirculated by removing the packet from the queue's head and placing it at the queue's tail. This eliminates the possibility of a long distance packet perpetually blocking a short distance packet, and essentially makes all packets stored in the queue available at the queue's head without having a packet depart the node. With this feature, it impossible for a deadlock to occur because a cycle of blocked queues can not be constructed. Within a queue of size m with p packets in it, there will be at least one packet whose distance from its destination is $\leq m-p$. For this queue to be permanently deadlocked, the next queue in the cycle must have at least p+1 packets and consequently at least one packet $\leq m-p-1$ hops from its destination. Moving along the postulated deadlocked cycle, the next queue must have p+2 packets and at least one packet $\leq m-p-2$ hops from its destination. On closing a cycle of length s, the last queue has a packet $\leq m-p-s$ hops from it destination. With a recirculating queue, this packet will not be perpetually blocked and when it reaches the head of the queue, it will be allowed to move on since the original queue has an available buffer size of m-p. Therefore, deadlock can not occur.

The second feature of the Lambda network to avoid deadlock is localized deadlock detection. Recirculating the queues has some undesirable features such as altering the ordering of packets arriving at one node that were sent by another node; consequently, recirculation is only used when deadlock is imminent. Examining the states of all queues in a deadlocked cycle is necessary to prove deadlock, but proving deadlock is not mandatory for using recirculation. Localized deadlock detection monitors the queues in a single node. If there is no activity in a nonempty queue for a specified period of time, the queue is assumed blocked by deadlock and recirculation is performed. Recirculating queues can be given priority at the output link multiplexers, temporarily supplanting their normal round robin priority scheme.

The Lambda network's expected reliability comes from the $\mathbb{O}(n)$ components for an n node network. For the Lambda network to fail there must be at least four link failures, and for the particular case of four link failures, all four must be attached to the same node and only the processing element attached to that node is disjoined from the network.

The Lambda network is made fault tolerant by modifying the switching function so that packets are routed around damaged areas in the network. When a packet enters a node destined for a processing element not attached to that node, there are four possible paths available to it corresponding to the four links attached to the node. The switching function described in the routing section selects the output link along the minimum length path. Instead of selecting one output link, a fault tolerant switching function arranges the possible outputs in nondecreasing path length order. The ROM lookup table contains the four possible paths in order for each address. The packet is routed out the first path link in this ordering that has not failed. To avoid transfer cycles (movement of the packet around a circular path), the ordering is modified so that the output link corresponding to the input link is placed fourth, i.e., a packet can leave a node along the same link it entered the node only if all three other node links have failed. The network deals with failed nodes by assuming that the links attached to a failed node have also failed, and performing the routing based on the set of failed links as described previously.

The performance of the Lambda network is shown via three example problems. These three problems reveal the effects of network size, transient and steady state packet generation, and the three possible network node designs on the performance. The bandwidth between a node and its attached processing element is set to be the same as between a pair of connected nodes. Problem One uses a thirty-two node network and assumes steady state packet generation with an offset task set of four tasks. The mean and maximum packet transfer times are determined for a range of mean packet departure times in the Poisson processes.

Problem Two and Problem Three both implement node networks having 1024 nodes. Problem Two assumes steady state packet generation and the task set is centered with four tasks adjacent to each task. The mean and maximum packet transfer times are determined for a range of packet departure times. Problem Three assumes transient packet generation. The adjacent task set is centered around each task and consists of eight tasks. The total transfer time is determined as a function of the number of packets initially departing each processing element. Because this number may be less than the size of the adjacent task set, the packets may be sent to only a subset of the adjacent tasks.

For the performance comparison, the total queue length within a node is fixed for all three Lambda node designs. The total storage capacity of a node is 768 packets: thus, the Type 1—no presort Lambda node has five queues with 154 places per queue, the Type 2—destination presort Lambda node has nine queues with 86 places per queue, and the Type 3—full presort Lambda node has 24 queues with 32 places per queue.

The results consist of the mean and maximum packet transfer times for Problem 1 and Problem Two and the total transfer time for Problem Three. These results are normalized to the time required to move a single packet between two adjacent Lambda network nodes.

Figure 9A:
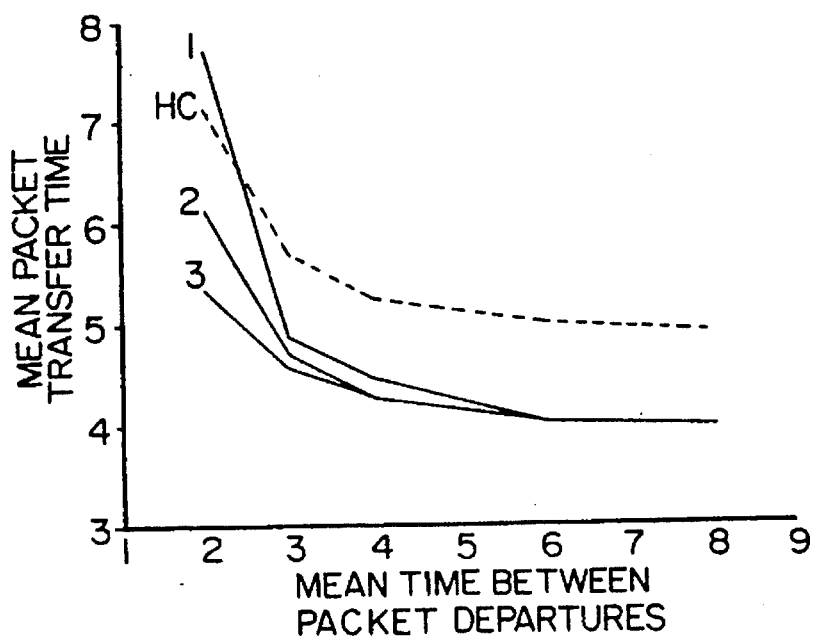
FIGS. 9a and 9b are graphs of mean and maximum packet transfer times as a function of mean packet departure time for a Lambda network having 32 nodes with Type 1 node design, a Lambda network with Type 2 node design, and a Lambda network with Type 3 node design, and a hypercube network with Type 2 node design.
Figure 9B:
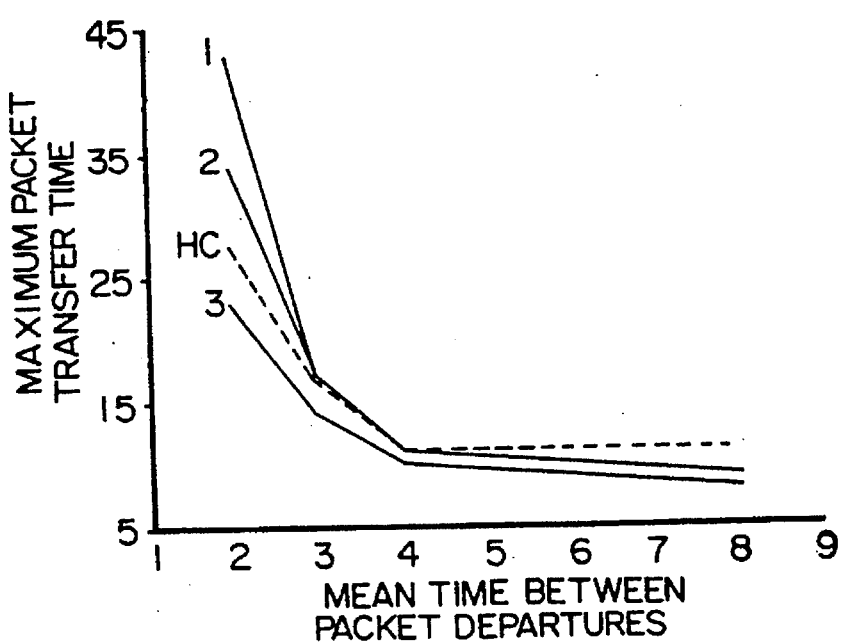

The results for Problem One are shown in FIGS. 9a and 9b. For most cases of node design and packet departure rate, the Lambda network slightly outperforms the hypercube network with respect to mean packet transfer time. The maximum packet transfer times are about equal.

With respect to saturation effects, as the mean time between packet departures decreases, the number of conflicts increases and the number of packets in queues increases. More packets are being introduced into the network and each packet is staying in the network longer. Queues begin filling to capacity and small QSIZE values issued by them inhibit packet movement toward them thereby increasing the number of conflicts at neighboring nodes. This continues until all output paths from a node are blocked. However, the packets are still being generated in a Poisson manner by the attached processing element and these eventually fill all queue space within the node and the processing element. The network fails because it can no longer move or store the generated packets. The Lambda network falls in this manner when the mean time between packet departures becomes small enough. This failure is presaged by observing the radical rise in mean and maximum packet transfer times as the mean departure time decreases. For Problem One on the 32 node networks, the onset of this failure occurs near the same packet departure rate.

Figure 10A:
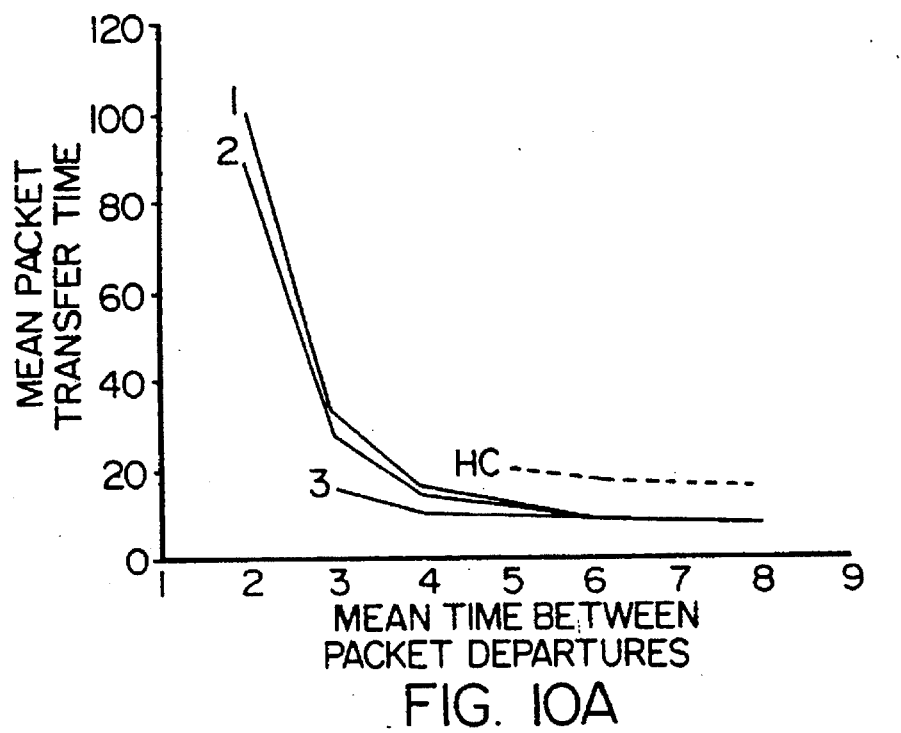
FIGS. 10a and 10b are graphs of mean and maximum packet transfer times as a function of mean packet departure time for a Lambda network having 1024 nodes.
Figure 10B:
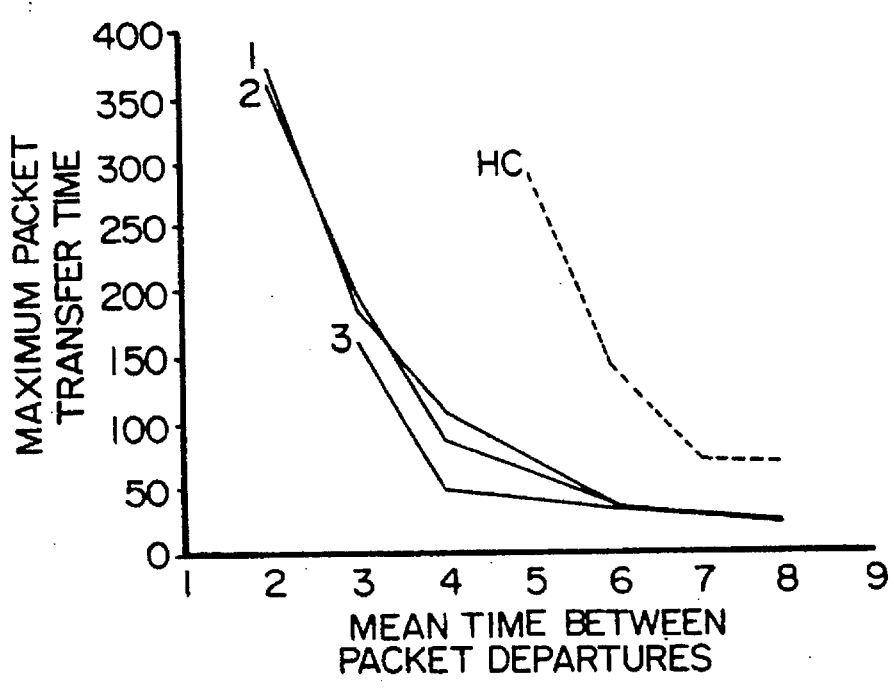

The results for Problem Two are somewhat different as shown in FIGS. 10a and 10b. The mean and maximum transfer times are consistently less for all three node designs of the Lambda network, but the onset and eventual failure of the Lambda network occurs at twice the packet departure rate. The Lambda network is sensitive to the packet departure time; decreasing the mean packet departure time by twenty percent from five to four is enough to double the maximum packet transfer time. Similar small changes in the mean departure time for the Lambda network produce similar debilitating effects albeit at a much lower mean departure time.

Figure 11:
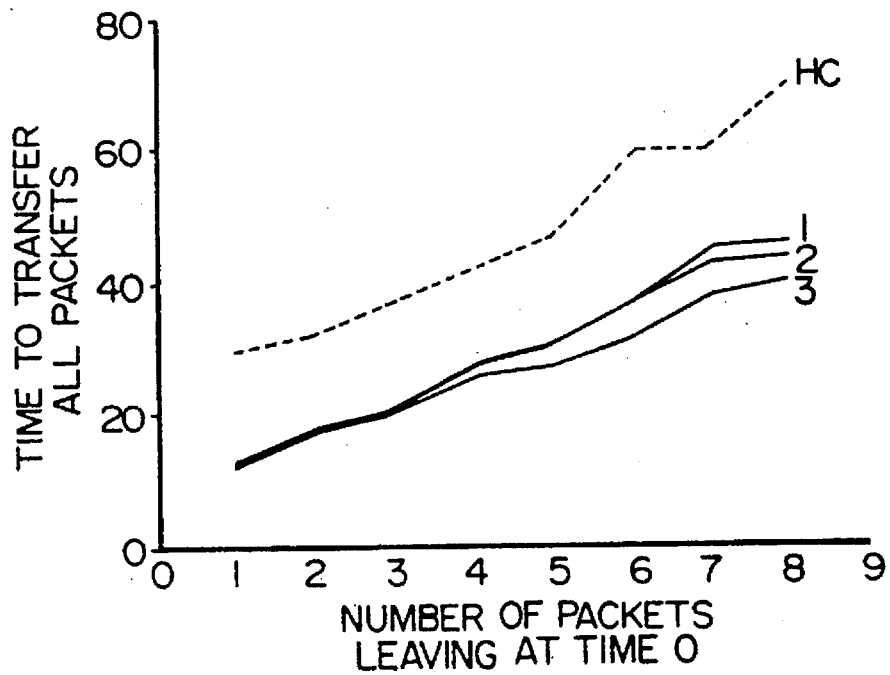
FIG. 11 is a graph of total packet transfer time as a function of the number of departing packets per node for a Lambda network having 1024 nodes.
Figure 12:
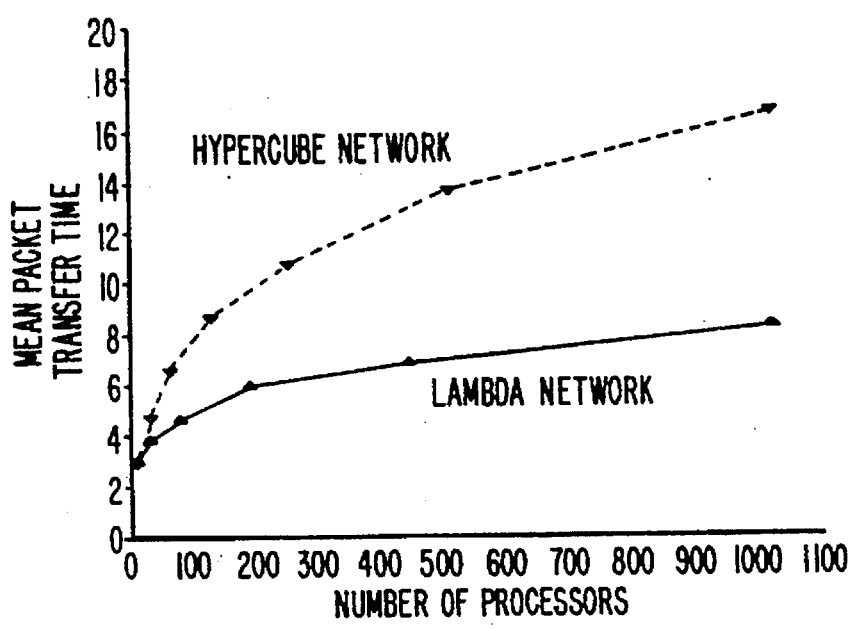
FIG. 12 is a graph comparison of mean packet transfer time for Lambda and hypercube networks of varying size.

The performance of the two networks for transient problems is shown in the results for Problem Three. These results are displayed in FIG. 11 as a function of the number of packets leaving each processing element at time 0, the starting time for communication phase in the transient communication problem. The time to complete the transfer of all packets is greater in the hypercube network than for all three Lambda network implementations. Because of the stochastic nature of the problem model, the curves representing the transfer time as a function of the number of departing packets are not perfectly smooth, but the trend is evident.

It is thought that the present invention and many of its attendant advantages will be understood from the description and it will be apparent that various changes may be made in the form, construction and arrangement thereof without departing from the spirit and scope of the invention or sacrificing all of its material advantages. The invention hereinbefore described is merely a preferred or exemplary embodiment.

What is claimed is:

1. A multiprocessor communication network for transfer of data packets in a distributed memory parallel processor computing system, comprising:

(a) a plurality of nodes arranged in m stages with $2^{m-1}$ nodes in each of said stages, each of said nodes being connected by links to four other nodes;

(b) a plurality of processing elements equal to the number of nodes, one of each of said processing elements located at and connected to one node by a link;

(c) means at each node for localized control of packet routing between nodes; and (d) means at each node for bidirectionally routing packets between nodes, whereby the number of nodes in said network is $m2^{m-1}$ nodes, where m is an integer having a value greater than two.

2. The network of claim 1, wherein each node further includes:

(a) a switch point for routing packets from one link to another; and b) a node input communication port and a node output communication port at each link for the transfer of packets between a specific node and each of the four other nodes connected to said specific node; and (c) a processing element input communication port and a processing element output communication port for the transfer of packets between said specific node and its processing element.

3. The network of claim 2, wherein each of said nodes further comprise:

(a) at least one input FIFO queue associated with each of said input communication ports;

(b) an output multiplexer; and (c) routing determination circuitry, wherein a packet arriving at one of said nodes is placed in one of said input FIFO queues, and said routing determination circuitry selects one of said communication output ports for routing said packet, and said output multiplexer outputs said packet.

4. The network of claim 3, wherein said means at each node for localized control of packet routing between nodes includes:

(a) means for constructing a current loop address of the packet given a current node address;

(b) means for constructing a destination loop address of the packet given a destination node address:

(c) means for transforming the current loop address to the destination loop address to produce a loop resultant; (d) means for normalizing stage addresses one of which is a destination stage address and the loop resultant; and (f) means for switching loops according to the value of a predetermined bit of the normalized loop resultant;

(g) means for selecting four possible paths to a destination node;

(h) means for arranging the possible paths in order of shortest length and so that the output path corresponding to the input port through which the packet arrived is placed in fourth position; and (i) means for routing the packet out a first intact path link.

5. The network of claim 4, wherein said means for bidirectionally routing packets between nodes includes means for changing direction according to the value of a predetermined bit of the normalized destination stage address, the value of a predetermined bit of the normalized loop resultant, and stage size of the system.

6. The network of claim 5, further comprising means for avoiding deadlock.

7. The network of claim 6, wherein said means for avoiding deadlock comprises:

(a) means for determining the number of nodes that a packet must traverse to reach its destination node;

(b) means for transmitting the packet to the next node only when a number of packet storage spaces in a fullest input queue of the next node is equal to the number of nodes that a data packet must traverse to reach its destination; and (c) means for recirculating packets in any queue when packets have not been transmitted from a queue after a predetermined time.

8. The network of claim 7, where there is one input FIFO queue connected to each of said input communication ports.

9. The network of claim 7, where there are two input FIFO queues connected to each of said input communication ports; a first input FIFO queue for storing packets to be routed to said processing element associated with said specific node, and a second input FIFO queue for storing packets to be routed to other nodes.

10. The network of claim 7, where there are five input FIFO queues connected to each of said input communication ports; four of the five queues storing packets to be routed to each of the four connected nodes, and one of said FIFO queues storing packets to be routed to said processing element associated with said specific node.

11. A method for local control of routing data packets between nodes along bidirectional loops in a distributed memory parallel processor computer system comprising a plurality of nodes arranged in m stages with $2^{m-1}$ nodes in each of said stages, each of said nodes being connected by links to four other nodes, a plurality of processing elements equal to the number of nodes, one of each of said processing elements located at and connected to one node by a link, means at each node for localized control of packet routing between nodes, and means at each node for bidirectionally routing packets between nodes, whereby the number of nodes in said network is $m2^{-1}$ nodes, where m is an integer having a value greater than two, the method comprising the steps of:

(a) constructing a current loop address of the packet given a current node address;

(b) constructing a destination loop address of the packet given a destination node address;

(c) transforming the current loop address to the destination loop address to produce a loop resultant;

(d) normalizing a destination stage address and the loop resultant;

(f) switching loops according to the value of a predetermined bit of the normalized loop resultant; and (g) changing direction according to the value of a predetermined bit of the normalized destination stage address, the value of a predetermined bit of the normalized loop resultant, and stage size of the system.

12. The method of claim 11, further comprising the steps of:

(h) selecting four possible paths to a destination node;

(i) arranging the possible paths in order of shortest length and so that the output path corresponding to the input port through which the packet arrived is placed in fourth position; and (j) routing the packet out a first intact path link.

13. A method for deadlock avoidance in a distributed memory parallel processor computer system comprising a plurality of nodes arranged in In stages with $2^{m-1}$ nodes in each of said stages, each of said nodes being connected by links to four other nodes, a plurality of processing elements equal to the number of nodes, one of each of said processing elements located at and connected to one node by a link, means at each node for localized control of packet routing between nodes, and means at each node for bidirectionally routing packets between nodes, whereby the number of nodes in said network is $m2^{m-1}$ nodes, where m is an integer having a value greater than two, and having at least one input FIFO queue connected to each node input communication port at each link for the transfer of packets between a specific node and each of the four other nodes connected to said specific node and connected to a processing element input communication port for the transfer of packets between a specific node and its processing element, said method comprising the steps of:

(a) determining the number of nodes that a data packet must traverse to reach its destination node;

(b) transmitting the packet to the next node only when a number of packet storage spaces in a fullest input queue of the next node is equal to the number of nodes that a packet must traverse to reach its destination; (c) recirculating packets in any queue when packets have not been transmitted from a queue after a predetermined time.

14. A multiprocessor communication network for the transfer of data packets in a distributed memory parallel processor computing system, comprising:

(a) a plurality of nodes arranged in m stages, each of said stages having $2^{m-1}$ nodes, each of said nodes being connected by links to four other nodes, each node including a switch point for routing packets from one link to another, a node input communication port and a node output communication port at each link for the transfer of packets between a specific node and each of the four other nodes connected to said specific node, a processing element input communication port and a processing element output communication port for the transfer of packets between said specific node and its processing element, at least one input FIFO queue connected to each of said communication ports for storing packets to be routed to each of the four connected nodes, and one of said FIFO queues storing packets to be routed to said processing element associated with said specific node, an output multiplexer connected to each output communication port, and routing determination circuitry;

(b) a plurality of processing elements equal to the number of nodes, one of each of said processing elements located at and connected to one node by a link;

(c) means at each node for localized control of packet routing between nodes, said means for localized control includes means for constructing a current loop address of the packet given a current node address including a current stage address, means for constructing a destination loop address of the packet given a destination node address having a destination stage address, means for transforming the current loop address to the destination loop address to produce a loop resultant, means for normalizing the stage addresses and the loop resultant, means for switching loops according to the value of a predetermined bit of the normalized loop resultant, means for selecting four possible paths to a destination node, means for arranging the possible paths in order of shortest length so that the output path corresponding to the input port through which the packet arrived is placed in fourth position, and means for routing the packet out a first intact path link;

(d) means at each node for bidirectionally routing packets between nodes by changing direction according to the value of a predetermined bit of the normalized destination stage address, the value of a predetermined bit of the normalized loop resultant, and stage size of the system; and (e) means for avoiding deadlock which includes means for determining the number of nodes a packet must traverse to reach its destination node, means for transmitting the packet to the next node only when the number of packet storage spaces in a fullest input queue of the next node is equal to the number of nodes that a packet must traverse to reach its destination, and means for recirculating packets in any queue when packets have not been transmitted from a queue after a predetermined time, whereby the number of nodes in said network is $m2^{m-1}$ nodes, where m is an integer having a value greater than two and wherein a packet arriving at one of said nodes is placed in one of said input FIFO queues, and said routing determination circuitry selects one of said communication output ports for routing said packet, and said output multiplexer outputs said packet.

* * * * *

UNITED STATES PATENT AND TRADEMARK OFFICE
CERTIFICATE OF CORRECTION

PATENT NO. : 5,471,623

DATED : November 28, 1995

INVENTOR(S) : Leonard M. Napolitano, Jr.

It is certified that error appears in the above-identified patent and that said Letters Patent is hereby corrected as shown below:

On the title page, column 1 between item 76 and item 21 add item 73 "Assignee: The United States of America as represented by the United States Department of Energy, Washington, D.C."

On the title page, column 2 before item 57 add: "Attorney, Agent, or Firm—Karuna Ojanen; James H. Chafin; William R. Moser"

Signed and Sealed this

Twenty-first Day of May, 1996

Attest:

BRUCE LEHMAN

Attesting Officer

Commissioner of Patents and Trademarks